United States Patent [19]
Ishihara

[11] 3,815,149
[45] June 4, 1974

[54] FINDER ATTACHMENT FOR CAMERAS

[75] Inventor: Kazuo Ishihara, Sakai, Japan

[73] Assignee: Minolta Camera Kabushiki Kaisha, Osaka, Japan

[22] Filed: Nov. 24, 1972

[21] Appl. No.: 309,293

[30] Foreign Application Priority Data
Dec. 3, 1971 Japan.............................. 46-114416

[52] U.S. Cl.............................. 354/223, 354/224
[51] Int. Cl...................... G03b 13/04, G03b 13/08
[58] Field of Search........................ 95/11 V; 88/1.5

[56] References Cited
UNITED STATES PATENTS
1,267,404   5/1918   Halsey.............................. 88/1.5 R
1,278,132   9/1918   Fulford et al...................... 88/1.5 R Primary Examiner—Samuel S. Matthews
Assistant Examiner—Kenneth C. Hutchison
Attorney, Agent, or Firm—Wolder & Gross

[57] ABSTRACT

A finder block comprises a condenser lens, an image-forming lens with its optical axis intersecting the optical axis of the condenser lens approximately at right angles, a first reflecting plane for reflecting incident light on the condenser lens toward the image-forming lens, a second reflecting plane formed on the rear face of the first reflecting plane, a second incidence window for the second reflecting plane, and a second eyepiece window for viewing an image reflected from the second reflecting plane. A support member, shiftably attached to the camera main body, can support the finder block on the camera at the objective side or eyepiece side of the camera finder or at a position other than these positions as desired.

9 Claims, 16 Drawing Figures

PATENTED JUN 4 1974 3,815,149

FINDER ATTACHMENT FOR CAMERAS

BACKGROUND OF THE INVENTION

This invention relates to a finder attachment for cameras, more particularly to a finder attachment having the functions of both angle finder and brilliant finder.

In taking photographs, the finder built in the camera is used and, depending on the situation, an angle finder or brilliant finder is also used which is included in the camera accessories as a separate attachment. What is meant by an angle finder is a finder attachment detachably mountable on a camera finder at the eyepiece side thereof, and includes a mirror for reflecting light from the camera finder in a direction at right angles to the optical axis of the camera finder, and what is meant by a brilliant finder is a small size reflex viewfinder including a condenser lens, an image-forming lens with its optical axis intersecting the optical axis of the condenser lens at approximately right angles and an oblique mirror reflecting light traversing the condenser lens through the image forming lens to provide a brilliant or bright image. Such finder is mounted on the camera every time it is used and removed therefrom when not in use. Thus the finder attachment causes inconvenience when the camera and its accessories are carried around and handled and renders the camera less amenable to a rapid photographing operation if it requires much time and trouble to mount the attachment on the camera or remove it therefrom.

SUMMARY OF THE INVENTION

An object of this invention is to provide a finder attachment in which an angle finder and a brilliant finder are built into one compact block, with one member serving as a reflecting member for both finders or with two reflecting members therefor disposed conjointly.

Still another object of this invention is to provide a device for easily and readily effecting a changeover operation to use the finder built in the camera or to use the angle finder or brilliant finder, with the finder attachment mounted on the camera.

Accordingly, the device of this invention comprises a finder block including a condenser lens, an image-forming lens with its optical axis intersecting approximately at right angles to the optical axis of the condenser lens, and a reflecting member having a first reflecting plane for reflecting the incident light on the condenser lens toward the image-forming lens; and a support member to be detachably mounted on the camera main body to support the finder block at the objective side or eyepiece side of the camera finder or at a position other than these positions as desired. A second reflecting plane is formed on the rear face of the first reflecting plane of the reflecting member. The finder block has a second incidence window for the second reflecting plane and a second eyepiece window for viewing an image reflected from the second reflecting plane. When the finder block is supported at the objective side of the camera finder, the combination comprising the condenser lens, image-forming lens and first reflecting plane serves as a brilliant finder, whereas if supported at the eyepiece side, the finder block serves as an angle finder in which an image on the camera finder is reflected by the second reflecting plane toward the second eyepiece window.

Thus the finder attachment of this invention has incorporated therein an angle finder and a brilliant finder in compact arrangement, so that the camera can be carried around all the time with the finder attachment mounted thereon. It can be set in position at the objective side or eyepiece side of the camera finder very easily and rapidly.

Other objects and features of this invention will become more apparent from the following description.

DESCRIPTION OF THE PREFERRED EMBODIMENTS

Figure 1:
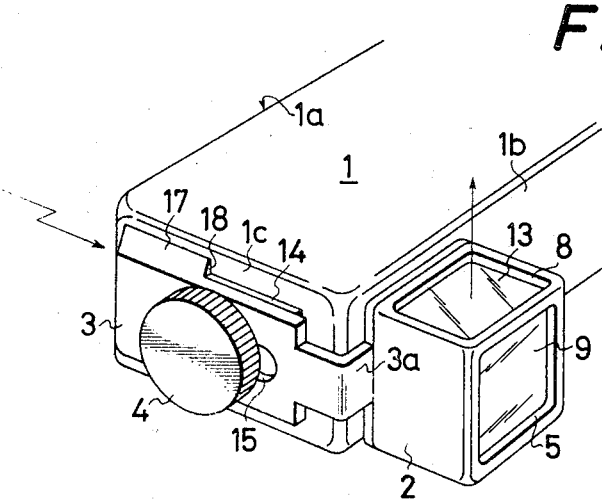
FIG. 1 is a perspective view showing the principal part of an embodiment of this invention as it is set in position as an angle finder.

Referring to the drawings, indicated at 1 is a camera main body and at 2, a finder block which is secured to an arm 3a of a support member 3 by securing means to be described later. The support member 3 is removably fastened by a screw 4 to a suitable side face 1c of the camera main body other than the objective side and eyepiece side of the camera main body 1.

Figure 5:
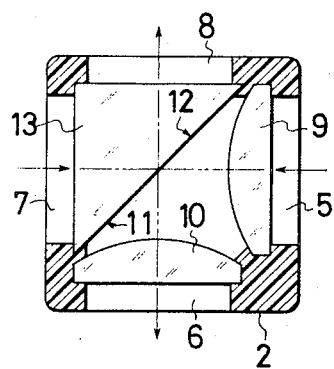
FIG. 5 is a view showing the optical system of a finder block according to this invention.

As shown in FIG. 5, the finder block 2 has a first incidence window 5 and a second incidence window 7 disposed symmetrically and a first eyepiece window 6 and a second eyepiece window 8 which are likewise arranged. A condenser lens 9 is secured to the first incidence window 5 and an image-forming lens 10, to the first eyepiece window 6, with the optical axes of the lenses 9 and 10 intersecting each other at right angles. The finder block 2 incorporates therein a prism 13 having a first reflecting plane 11 for reflecting the incident light on the condenser lens 9 toward the image-forming lens 10. The rear side of the first reflecting plane 11 serves as a second reflecting plane 12 by which the light passing through the second incidence window 7 is reflected toward the second eyepiece window 8. Thus, the condenser lens 9, first reflecting plane 11 and image-forming lens 10 provide a brilliant finder, while the second incidence window 7, second reflecting plane 12 and second eyepiece 8 constitute an angle finder. In the above construction the prism 13 may be replaced by a reflecting mirror (not shown) having the first reflecting plane 11 and the second reflecting plane 12. Alternatively, two reflecting mirrors may be disposed back-to-back to provide the first reflecting plane 11 and the second reflecting plane 12 within the finder block.

Figure 3:
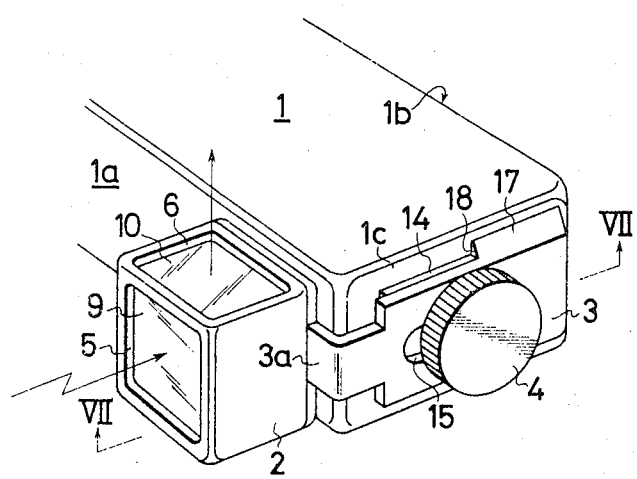
FIG. 3 is a perspective view showing the same embodiment as it is set in position as a brilliant finder.
Figure 6:
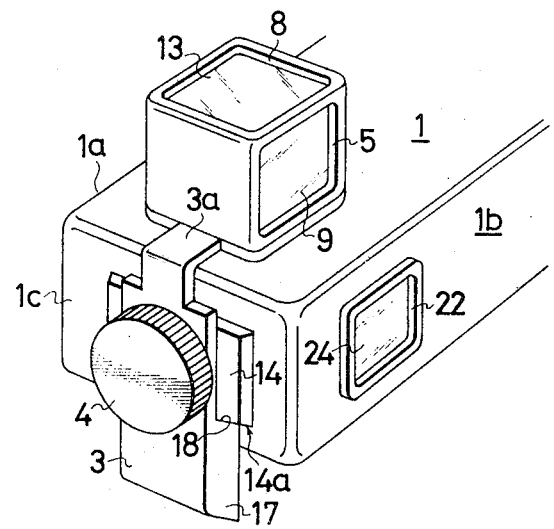
FIG. 6 is a perspective view showing the same embodiment as it is mounted at a position other than the objective side or eyepiece side of the camera finder.
Figure 7:
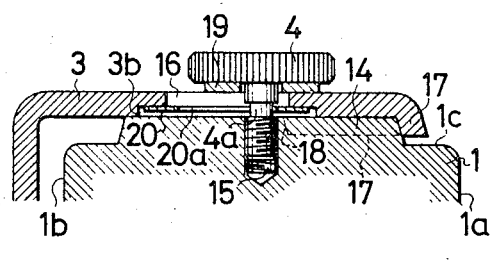
FIG. 7 is a view in section taken along the line VII—VII in FIG. 3 and showing a construction for holding a support member for the finder block to the camera main body.
Figure 8:
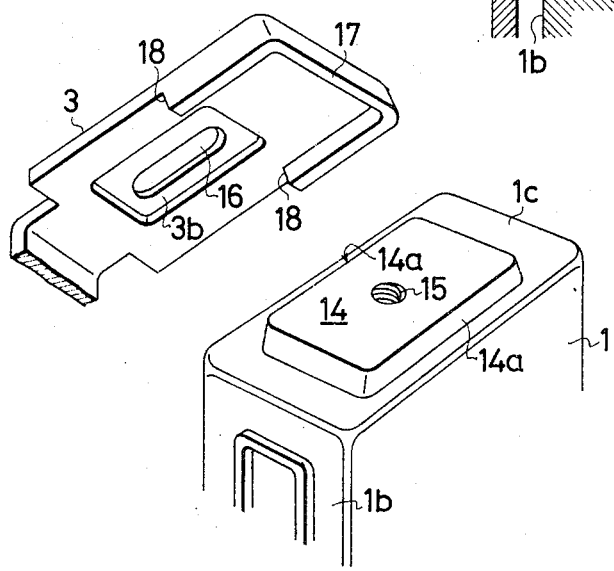
FIG. 8 is a perspective view showing the details of the support member and part of the camera main body where it is secured.

FIGS. 7 and 8 show means for securing the support member 3 to the camera main body 1. It is seen that a rectangular platform-like seat 14 is formed on a suitable side face 1c of the camera main body 1 other than the objective side 1a and eyepiece side 1b thereof, with a threaded bore 15 formed approximately at its center. The support member 3 is formed in its base plate portion with a slot 16 and has on its rear face a projecting edge 17 fitting around approximately one-half of the periphery of the platform-like seat 14. The screw 4 extending through the slot 16 and screwed into the threaded bore 15 fastens the support member 3 to the camera main body 1 as shown in FIGS. 1, 3 and 6. When the support member 3 is secured to the camera main body 1 in the position shown in FIG. 16, the ends 18 of the projecting edge 17 engage with the longer side 14a of the seat 14 and serve as stoppers for determining the position of the finder block 2 when it is fixedly mounted on the camera at a position other than the objective side and eyepiece side of the camera finder. Indicated at 19 is a washer for the fastening screw 4, and at 20 is a retainer for preventing the screw 4 from dropping which has a slot 20a in engagement with a small neck 4a of the screw 4. It is fitted in a recess 3b formed in the rear face of the support member 3.

Figure 2:
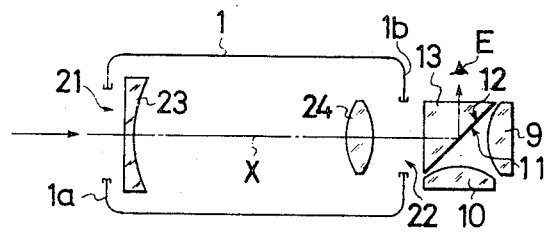
FIG. 2 is a schematic view showing the optical system of the same.

To support the finder block 2 at the eyepiece side of the camera finder, it is seen from FIGS. 1 and 2 that the projecting edge 17 of the support member 3 is fitted around the platform-like seat 14 of the camera main body 1 toward the objective side of the finder, with the fastening screw 4 securing the support member 3 to the camera main body 1, whereby the second incidence window 7 is positioned on the optical axis X of the finder, permitting the second reflecting plane 12 to reflect the image on the camera finder toward the second eyepiece window 8. Thus the finder block acts as an angle finder.

Figure 4:
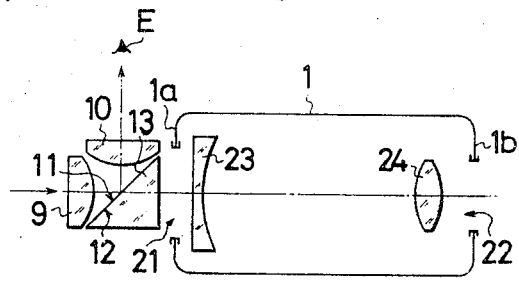
FIG. 4 is a schematic view showing the optical system of the same.

On the other hand, if the support member 3 is secured to the seat 14 in the opposite direction to the above as seen in FIGS. 3 and 4, with the finder block 2 rotated through 180° from the position of FIGS. 1 and 2 to the objective side of the camera finder, the image passing through the condenser lens 9 is reflected at the first reflecting plane 11 toward the image-forming lens 10. The finder block therefore serves as a brilliant finder. The support member 3 and the platform-like seat 14 are so designed that the field of view covered by the brilliant finder in this position of course coincides with the area to be photographed.

When photographs are taken by directly looking through the camera finder without using the angle finder and brilliant finder, the support member 3 is secured to the platform-like seat 14 by the fastening screw 4, with the ends 18 of projecting edge 17 of the support member 3 in engagement with the longer side 14a of the seat 14 as shown in FIG. 6, whereby the finder block 2 is supported on a side face of the camera other than the objective side or eyepiece side thereof. Accordingly, the finder block causes no trouble to the photographer when he looks through the camera finder and releases the shutter.

The fastening screw 4 need not be removed from the camera main body 1 when setting the finder block 2 in the above-mentioned respective positions, but may be loosened to such extent that the support member 3 can be rotated about the fastening screw 4. The slot 15 formed in the support member 3 for passing the fastening screw 4 makes it possible to rotate the member 3 and set it in the desired position easily and rapidly. Thus, the finder block 2 need not be removed from the camera main body 1, either. FIGS. 2 and 4 show the photographer's eye E, objective lens frame 21, eyepiece frame 22, objective lens 23, and eyepiece 24.

FIGS. 9 to 16 show means for securing the finder block 2 to the support member 3.

Figure 9:
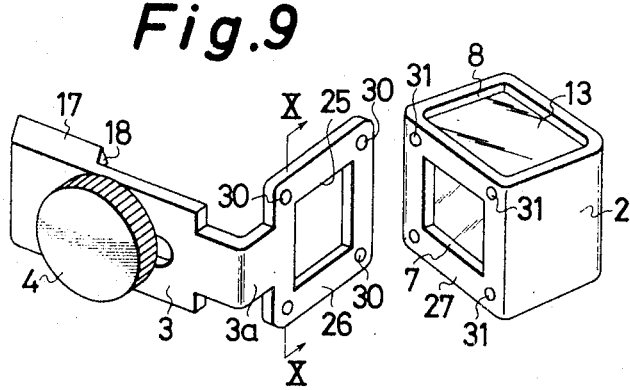
FIG. 9 is a perspective view showing an embodiment of means for securing the finder block to its support member.
Figure 10:
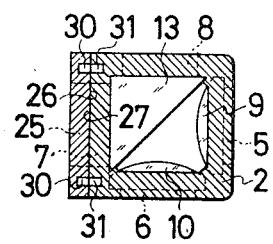
FIG. 10 is a view in section taken along the line X—X in FIG. 9 showing the block in secured state.

The securing means shown in FIGS. 9 and 10 comprises a seat frame 26 provided at the end of the arm 3a of the support member 3 and formed with a window 25 of the same size as or somewhat greater than the second incidence window 7 of the finder block 2. The seat frame 26 has permanent magnets 30 fixedly embedded in its four corner portions, with the magnetic poles exposed. On the other hand, the second incidence window 7 of the finder block 2 is surrounded by a fitting face 27 adapted for snug-fit contact with the seat frame 26 and having permanent magnets 31 fixedly embedded in its four corner portions and arranged in corresponding relation to the permanent magnets 30 respectively. The magnetic poles of the magnets 31 which are attractable by the exposed poles of the magnets 30 are exposed from the fitting face 27.

When the fitting face 27 of the finder block 2 is contacted with the seat frame 26, the magnetic attraction acting between the permanent magnets 30 and 31 always holds the finder block 2 to the support member 3.

If in the foregoing construction the permanent magnets 30 and 31 embedded in the four corners of the seat frame 26 and fitting face 27 respectively are arranged at equal spacing along a circumference with its center positioned on the optical axis of the finder, the finder block 2 can be set in position with specified orientation by rotating the block every 90°. It is therefore possible to control the orientation of the finder block as desired by varying the spacing between the permanent magnets 30 and 31 and as well as the number thereof. In this case, the seat frame 26 and fitting face 27 are of course made of a nonmagnetic material.

Alternatively, the combination of permanent magnets and nonmagnetic members may substitute for the permanent magnets 30 and 31.

If the attraction between the permanent magnets 30 and 31 fails to prevent the possible displacement of the finder block 2 from its set position, the seat frame 26 and fitting face 27 may be formed with engageable portions, one of which will fit in the other. This makes it possible to reduce the number of the permanent magnets 30 and 31.

Figure 11:
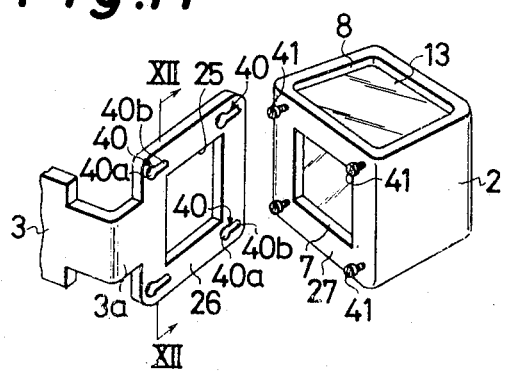
FIG. 11 is a perspective view showing another embodiment of the securing means.
Figure 12:
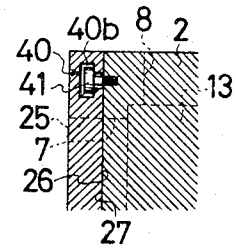
FIG. 12 is a view in section taken along the line XII—XII in FIG. 11 and showing the block in secured state.

FIGS. 11 and 12 show another embodiment of the securing means, in which the fitting face 27 of the finder block 2 is provided with four stepped pins 41 arranged at equal spacing along a circumference having its center on the optical axis of the finder. The seat frame 26 of the support member 3 defining the window 25 is formed in corresponding relation to the stepped pins 41 with keyhole-like slots 40 each having a circular opening 40a for permitting the insertion of the stepped pin 41 and a dovetail groove portion 40b extending from the opening 40a and adapted for engagement with the head of the pin 41.

According to this construction, the heads of the stepped pins 41 are first inserted into the circular openings 40a of the slots 40 and the finder block 2 is then slid on the seat frame 26 to move the stepped pins 41 into the dovetail portions 40b for engagement in the slots 40. In this way, the finder block 2 can be fixedly mounted on the seat frame 26.

By suitably determining the positions of the stepped pins 41 and keyhole-like slots 40 relative to each other, the finder block 2 in this case can be rotated every 90° to a specified or suitable position to control its orientation as in the case of FIGS. 9 and 10. To assure engagement between the stepped pins 41 and keyhole-like slots 40, the slots 40 may be provided with unillustrated click stops, or a plate spring (not shown) may be provided between the seat frame 26 and fitting face 27 which spring acts in such direction as to urge the same away from each other.

Figure 13:
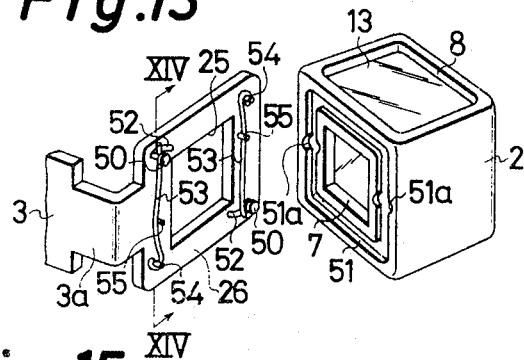
FIG. 13 is a perspective view showing another embodiment of the securing means.
Figure 14:
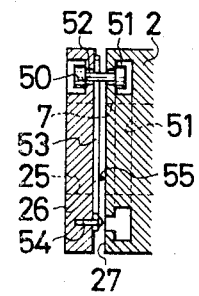
FIG. 14 is a view in section taken along the line XIV—XIV in FIG. 13 and showing the block in secured state.

According to the embodiment shown in FIGS. 13 and 14, the fitting face 27 of the finder block 2 is formed with a continuous dovetail groove 51 extending in a square form and having its center positioned on the optical axis of the finder. On the other hand, seat frame 26 is formed with arcuate grooves 52 for retaining a pair of headed pins 50 so disposed as to be engageable in the opposite corners of the dovetail groove 51. The pins 50 engaged in the arcuate grooves 52 are urged by springs 53 outwardly of the center of the finder. Indicated at 54 are pins for securing the fixed ends of the springs 53 to the seat frame 26 and at 55 pins for fulcruming the springs 53.

The heads of the headed pins 50 are engaged into the dovetail groove 51 from the inlets 51a of the dovetail groove 51, and the finder block 2 is rotated to bring the headed pins 50 to the corners of the dovetail groove 51. Further the finder block 2 can be rotated every 90° to alter its orientation, with its pins 50 in engagement with the dovetail groove 51. At this time, the headed pins 50 move in the arcuate grooves 52 along the dovetail groove 51 against the elastic force of the springs 53 and act as clip stops upon reaching the aforementioned corners to determine the position of the finder block 2. It is preferable to interpose between the seat frame 26 and fitting face 27 a plate spring or the like urging then away from each other. In this way, the chattering of the finder block 2 in secured state can be precluded.

Figure 15:
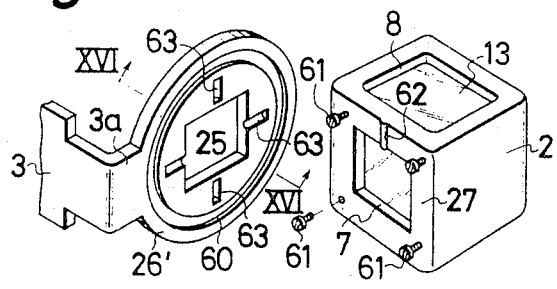
FIG. 15 is a perspective view showing another securing means.
Figure 16:
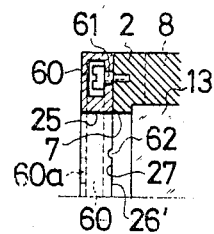
FIG. 16 is a view in section taken along the line XVI—XVI in FIG. 15 and showing the block in secured state.

FIGS. 15 and 16 show another embodiment in which the support member 3 has a disc-like seat frame 26' which is formed with an annular dovetail groove 60 having its center positioned on the optical axis of the finder. Stepped screws 61 with heads engageable in the dovetail groove 60 are fixedly screwed in the fitting face 27 of the finder block 2. The finder block 2 is therefore rotatably supported on the seat frame 26'. To fit the head of the stepped screw 61 into the dovetail groove 60, a screw hole 60a for inserting the screw 61 extends from the rear face of the seat frame 26' to the dovetail groove 60. The seat frame 26' is first fitted to the fitting face 27, and the stepped screw 61 is passed through the hole 60a and screwed into the fitting face 27. To provide a click stop, a projection 62 formed on the fitting face 27 is engageable with each of a suitable number of recesses 63 in the seat frame 26', whereby the orientation of the finder block 2 can be controlled as desired.

What is claimed is:

1. An optical finder device for a camera comprising a housing having four windows formed therein arranged as four sides of a cube to form a square cylinder, a condenser lens registering with a first of said windows, an image-forming lens registering with a second of said windows perpendicular to said first window and having an optical axis substantially perpendicular to the optical axis of said condenser lens, and reflecting means located in said housing and including a planar reflector front face confronting said lenses and forming an angle of approximately 45° to the optical axes thereof and a planar reflector rear face confronting the third and fourth of said windows and forming an angle of approximately 45° therewith.

2. A finder attachment for a camera including an eyepiece and an objective comprising:
a finder block having four windows arranged as four sides of a cube to form a square cylinder and including an incidence first window, an outlet second window perpendicular to said first window, an incidence third window, and an outlet fourth window perpendicular to said third window,
a reflector surface located in said block and including first and second opposite reflecting planes at an angle of approximately 45° to each of said windows,
a condenser lens registering with said first window,
an image forming lens registering with said second window, said first reflecting plane facing and intersecting the optical axes of said lenses at approximately 45° and said second reflecting plane reflecting light entering said third window through said fourth window, and
mounting means including a support member for supporting said finder block on said camera for selective adjustment to a plurality of positions, including a first position with said third window registering with said camera eyepiece, a second position with said condenser lens facing along the direction of said camera objective and at least one other position.

3. The finder attachment as set forth in claim 2 further comprising position determining means for accurately defining said first and second position of the support means.

4. The finder attachment as set forth in claim 3 wherein the position determining means comprises a projecting edge formed on a base portion of the support member and adapted to fit to part of a raised seat on a side face of a camera, the ends of the projecting edge being engageable with one side face of the seat, the base portion of the support member having a slot and a fastening screw engageable with the seat.

5. The finder attachment as set forth in claim 2 further comprising securing means for detachably mounting the finder block on the support member with the orientation of the finder block being adjustable relative to the support member.

6. The finder attachment as set forth in claim 5 wherein said support member includes a seat frame and the securing means comprises interengageable keyhole slots and headed pins located on said seat frame and the finder block.

7. The finder attachment as set forth in claim 5 wherein said support member includes a seat frame and the securing means comprises a dovetail groove peripherally extending about a rectangular path and a pair of relatively outwardly biased headed pins releasably engaging said groove and located on the seat frame and the block.

8. The finder attachment as set forth in claim 5 wherein said support member includes a circular seat frame and the securing means comprises a dovetail groove extending continuously in a circular path in said seat frame and a plurality of stepped screws projecting from the finder block and having heads engageable in the dovetail groove.

9. The finder attachment as set forth in claim 5 wherein said support member includes a seat frame and the securing means comprises magnetic members embedded in said seat frame and magnetic members embedded in the finder block arranged to be positioned adjacent to the magnetic members of the seat frame in the mounted position of the block.

* * * * *